United States Patent [19]

Kallenbach et al.

[11] Patent Number: 4,904,502

[45] Date of Patent: Feb. 27, 1990

[54] COATINGS OF ARYLENE SULFIDE POLYMERS

[75] Inventors: Lyle R. Kallenbach; Michael C. Yu, both of Bartlesville, Okla.

[73] Assignee: Phillips Petroleum Company, Bartlesville, Okla.

[21] Appl. No.: 324,053

[22] Filed: Mar. 16, 1989

Related U.S. Application Data

[62] Division of Ser. No. 18,361, Feb. 24, 1987, Pat. No. 4,835,051.

[51] Int. Cl.$^4$ ............................................... B05D 3/02
[52] U.S. Cl. ...................... 427/314; 427/318; 427/380; 427/388.1; 427/389.7; 427/393.6
[58] Field of Search ............... 427/314, 318, 385.5, 427/388.1, 389.7, 389.8, 380, 343.6

[56] References Cited

U.S. PATENT DOCUMENTS

| | | | |
|---|---|---|---|
| 3,354,129 | 11/1967 | Edmonds, Jr. et al. | 360/79 |
| 3,492,125 | 1/1970 | Ray | 99/1 |
| 3,616,186 | 10/1971 | Blackwell | 428/419 |
| 3,622,376 | 11/1971 | Tieszen et al. | 117/132 B |
| 3,634,125 | 1/1972 | Tieszen | 117/49 |
| 3,652,327 | 3/1972 | Hill, Jr. et al. | 117/132 B |
| 3,701,665 | 10/1972 | Grimes et al. | 99/1 |
| 3,728,313 | 4/1973 | Hill, Jr. et al. | 260/79 |
| 3,744,530 | 7/1973 | Perry | 138/145 |
| 3,879,355 | 4/1975 | Blackwell | 260/79 |
| 3,884,873 | 5/1975 | Short | 260/45.85 B |
| 3,894,983 | 7/1975 | Higbee | 260/37 R |
| 3,930,078 | 12/1975 | Short | 427/388 |
| 3,931,419 | 1/1976 | Blackwell | 427/388 |
| 3,964,582 | 6/1976 | Mitchell | 192/58 B |
| 3,968,289 | 7/1976 | Higbee | 428/195 |
| 3,979,543 | 9/1976 | Higbee | 428/331 |
| 4,020,031 | 4/1977 | Merrill | 428/419 |
| 4,053,675 | 10/1977 | Blackwell | 428/426 |
| 4,064,084 | 12/1977 | Blackwell | 260/29.2 R |
| 4,132,823 | 1/1979 | Blackwell et al. | 428/215 |
| 4,145,326 | 3/1979 | Blackwell | 260/29.6 F |
| 4,212,922 | 7/1980 | Tieszen | 428/419 |
| 4,214,021 | 7/1980 | Blackwell | 427/385 R |
| 4,299,951 | 11/1981 | Campbell | 528/491 |
| 4,396,658 | 8/1983 | Mettes et al. | 428/36 |
| 4,690,972 | 9/1987 | Johnson et al. | 524/609 |

FOREIGN PATENT DOCUMENTS 0062830 10/1982 European Pat. Off.
61-87752 5/1986 Japan.

OTHER PUBLICATIONS

Technical Information Bulletin #100—"Ryton ® Polyphenylene Sulfide Resins and Compounds", 1979, pp. 8–13, Plastics Technical Center, Phillips Chemical Co., Bartlesville, OK.

Primary Examiner—Michael Lusignan
Attorney, Agent, or Firm—J. D. Brown

[57] ABSTRACT

Improved coatings derived from arylene sulfide polymers are provided by use of powered or liquid slurry coating formulations comprising a metal oxide and an arylene sulfide polymer which has an extrusion rate of about 80 to about 400 grams/10 minutes.

23 Claims, No Drawings

COATINGS OF ARYLENE SULFIDE POLYMERS

This application is a divisional of application Ser. No. 018,361, filed February 24, 1987, now U.S. Pat. No. 4,835,051, patented May 30, 1989.

FIELD OF THE INVENTION

This invention relates to arylene sulfide coatings. In another aspect this invention relates to methods of coating substrates with formulations comprising arylene sulfide polymers. In accordance with another aspect, this invention relates to powdered and liquid slurry coating formulations comprising arylene sulfide polymers which can be employed to obtain adherent corrosion resistant coatings substantially free of pinhole defects. In accordance with a still further aspect, this invention relates to sucker rods coated with compositions comprising arylene sulfide polymers for use in well pumping operations under corrosive environment conditions.

BACKGROUND OF THE INVENTION

It is broadly known to employ poly(arylene sulfide) compositions as coatings for a variety of substrate materials including iron-containing alloys such as steels of various types. Various methods are also known for applying the coating compositions which comprise the arylene sulfide polymers. Generally, the above-described coatings are subjected to a curing step prior to use of the coated substrate in the intended application.

In spite of the generally very good results obtained with the poly(arylene sulfide) coating compositions and methods of the prior art, it has been found that these known compositions and methods sometimes give unsatisfactory results when the coated substrate is employed under the harsh conditions which may include elevated temperatures, e.g. about 40° to about 125° C., and corrosive environments such as hydrogen sulfide, brines, carbon dioxide, and the like. Under such conditions the known arylene sulfide polymer coatings may fail catastrophically, e.g. peel off in large areas, or the underlying substrate may corrode rapidly around microscopically small defects in the coating. Such defects are frequently referred to as pinhole defects or holidays. In either case the coating has failed to protect the substrate and loss results from the failure of the coating. Attempts to employ alternative polymeric coatings under the harsh conditions described above have not proven to be satisfactory for a variety of reasons such as high materials cost and short lifetime due to failures of the same type as noted above.

Though we are not bound to any extent by the following theory, it is currently believed that the failure of arylene sulfide polymer coatings under the harsh conditions described above is primarily due to the presence of one or more exposed areas of substrate. Usually, these will be the pinhole defects that are difficult to observe even under a microscope. Nevertheless, the harsh environment attacks the substrate at such exposed areas with often devastating results. An apparent solution to the problem would be to use the known technique of multiple applications of the coating composition to the substrate. While this procedure has been somewhat effective, it has been found that the number of applications, using the conventionally employed arylene sulfide polymers, becomes prohibitively large and the coating often unacceptably thick to achieve a coated substrate substantially free of exposed substrate, e.g. pinhole defects.

Thus there is a need for poly(arylene sulfide) coating compositions and methods of application which will provide an adherent, corrosion resistant, relatively thin coating substantially free of pinhole defects which can be easily applied and which can withstand the harsh environment conditions described above.

It is therefore an object of this invention to provide coatings comprising at least one arylene sulfide polymer suitable for a variety of substrates which are adherent to said substrates, hard (abrasion resistant), corrosion resistant and substantially free of pinhole defects.

It is another object of this invention to provide a method of coating a variety of substrates with compositions comprising at least one arylene sulfide polymer which is simple to carry out and which produces an adherent, hard, corrosion resistant, relatively thin coating substantially free of pinhole defects.

It is another object of this invention to provide powdered and liquid slurry coating formulations comprising at least one arylene sulfide polymer which can be utilized in a variety of methods to coat a variety of substrates to obtain adherent, hard, corrosion resistant coatings substantially free of pinhole defects.

It is yet another object of this invention to provide well pumping tools and equipment such as sucker rods and tubing having a coating on at least one surface thereof wherein said coating comprises at least one arylene sulfide polymer and is adherent, hard, corrosion resistant, and substantially free of pinhole defects.

BRIEF SUMMARY OF THE INVENTION

In accordance with this invention powdered and liquid slurry coating formulations are provided which comprises at least one arylene sulfide polymer and a metal oxide wherein the arylene sulfide polymer has an extrusion rate of about 80 to about 400 grams/10 minutes. Further according to this invention, coated substrates which are obtained by the use of said coating formulations exhibit a cured coating that is adherent, hard, corrosion resistant and substantially free of pinhole defects.

DETAILED DESCRIPTION OF THE INVENTION

According to one embodiment of this invention is has been found that the use of a poly(arylene sulfide) having an extrusion rate of at least about 80 to about 400 g/10 min., preferably about 120 to about 300 g/10 min., and more preferably about 150 to about 250 g/10 min. in a coating formulation comprising a metal oxide will provide, after suitable curing, an adherent, hard, corrosion resistant coating substantially free of pinhole defects.

It is known that many arylene sulfide polymers, e.g. poly(p-phenylene sulfide) (PPS), can be characterized at least in part, by a melt flow rate. It is generally considered that a melt flow rate is inversely related to molecular weight. Extrusion rate (noted above) is a specific type of melt flow rate particularly useful for characterizing arylene sulfide polymers in the lower molecular weight range. As used throughout the specification and claims the term extrusion rate refers to a flow rate measurement on molten polymer based on ASTM D1238, Procedure B—Automatically Timed Flow Rate Measurement, at 600° F. (unless otherwise noted), using a total driving mass of 345 g and an orifice having the dimensions of 0.0825±0.002 inch diameter and 1.250±0.002 inch length. The more commonly encountered melt flow rate in g/10 min. for arylene sulfide polymers, though based on the same ASTM test procedure at 600° F., employs a total driving mass of 5,000 g (5 kg) and an orifice having the dimensions of 0.0825±0.002 inch diameter and 0.315±0.001 inch length.

Methods of preparing arylene sulfide polymers having an extrusion rate within the desired range are known. For example, U.S. Pat. No. 3,354,129 of Edmonds, et al provides a general method for preparing arylene sulfide polymers and in column 5 lines 5–28 discloses that an excess of polymerization reactant such as the polyhalo-substituted aromatic compound leads to lower molecular weight polymers. The use of a chain terminating agent is also disclosed in column 5 lines 62–66 as a means to limit the molecular weight of the polymer as formed.

Arylene sulfide polymers (PAS) which can be employed according to this invention can be described as polymers which contain repeat units of (ArS) where Ar represents an aromatic moiety having 1 or more phenyl rings and is preferably phenyl. It is preferred for reasons of availability and cost to use poly(p-phenylene sulfide) (PPS) as at least one poly(arylene sulfide) in the various embodiments of this invention.

As another important embodiment of this invention it has been found that blends of arylene sulfide polymers can provide improvements in coating properties such as ductility, adhesion, and hardness or scratch resistance compared with the use of a single polymer (PPS). As an example, it has been found that blends of a first arylene sulfide polymer having an extrusion rate within the range disclosed above with a second arylene sulfide polymer, wherein said second polymer is selected from the group consisting of poly(arylene sulfide/sulfone) (PASS) and poly(arylene sulfide/ketone) (PASK), provide improvements in coating properties as noted above. The PASS polymers contain repeating units of —Ar—S—Ar—SO$_2$— where Ar represents an aromatic moiety containing 1 or more phenyl rings and is preferably phenyl and the PASK polymers contain repeating units of —Ar—S—Ar—CO— where Ar represents an aromatic moiety containing 1 or more phenyl rings and is preferably phenyl. It is preferred for reasons of availability and cost that the poly(arylene sulfide/ketone) employed be poly(phenylene sulfide/ketone) (PPSK) and similarly the poly(arylene sulfide/sulfone) employed be poly(phenylene sulfide/sulfone) (PPSS). It is preferred for reasons of availability and cost that the first arylene sulfide polymer of the blends described above be PPS. When PPSK is employed as the second polymer of the blend the weight ratio of PPS to PPSK in the polymer blend should be about 0.1:1 to about 10:1, preferably about 3:1 to about 9:1. When PPSS is employed as the second polymer of the blend the weight ratio of PPS to PPSS in the polymer blend should be about 0.1:1 to about 10:1, preferably about 3:1 to about 7:1.

It has further been found that blends of PPS and PPSK used in coatings of metallic substrates according to this invention provide a significant improvement in ductility or elasticity of the coating. This was shown by the absence of cracks in the coating from the polymer blend whereas cracks developed in the PPS coating when the steel substrate was subjected to severe tensile stress i.e. at or near the tensile yield point for the steel substrate.

Both PPSS and PPSK are known polymers and can be prepared by methods disclosed in the art. For example, PPSS can be prepared as described in U.S. Pat. No. 4,016,145 of Campbell and PPSK can be prepared as described in U.S. Pat. No. 4,590,104 of Zeiner, et al.

For use in this invention, the PPSK should have a melt flow rate (ASTM D1238) measured at 700° F. (371° C.) with 5 kg driving mass of about 1 to about 1000 g/10 min., preferably about 100 to about 1000 g/10 min. For use in this invention the PPSS should have an inherent viscosity of about 0.05 to about 0.7, preferably about 0.05 to about 0.5 dL/g. The inherent viscosity of the PPSS is determined at 30° C. in N-methyl-2-pyrrolidone (NMP) at a polymer concentration of 0.5 g per dL NMP. Inherent viscosity can be determined using an Ostwald type capillary viscometer and is defined as (1 n$\eta_r$)/c where $\eta_r$ is the relative viscosity (viscosity of polymer solution/viscosity of solvent alone) and c is the polymer concentration in grams per deciliter (g/dL).

In another embodiment of this invention related to the use of arylene sulfide polymer blends, in coatings comprising a metal oxide, it has been found that blends of at least one first arylene sulfide polymer having an extrusion rate within the range of at least about 80 to about 400 g/10 min., with at least one second arylene sulfide polymer preferably of the same kind as the first but having an extrusion rate less than 80 g/10 min. (hereafter called low extrusion rate polymer), e.g. about 5 to about 75 g/10 min., can give, after curing, adherent, hard, corrosion resistant coatings substantially free of pinhole defects provided that the weight ratio of said first arylene sulfide polymer to said second arylene sulfide polymer in the blend is greater than about 0.2:1. Preferably, in accordance with this embodiment, each of the arylene sulfide polymers of the blend comprises a poly(p-phenylene sulfide) (PPS) for reasons of availability and cost. The use of this embodiment provides an economic benefit in that the low extrusion rate PPS is generally less expensive to produce than PPS having an extrusion rate within the range of about 80 to about 400 g/10 min.

The arylene sulfide polymer blends described above can be prepared in any convenient manner for use according to this invention. It is also possible to simply add the polymers separately when preparing the coating formulation followed by a period of mixing such as by ball milling, of the entire formulation. Formulations utilizing the polymer blends according to this invention can be applied in the same manner as those which contain a single poly(arylene sulfide) polymer.

The particle size of the arylene sulfide polymers utilized in this invention, whether as a polymer blend component or as a single polymer, should be principally in the range of about 10 microns to about 250 microns. Preferably, for reasons of ease of handling, ready availability, and smoothness of the coatings, the particle size of the arylene sulfide polymers should be about 100 to about 200 microns. Generally, arylene sulfide polymers as produced will fall within the desired particle size range. However, if larger polymer particle sizes are available such particles can be reduced in size by known techniques such as grinding, air milling, ball milling and the like in order to reach the desired smaller size range. If desired, the polymer particle size reduction step can be conducted during mixing of the coating formulation ingredients such as by ball milling which is a known procedure in preparing arylene sulfide polymer coating formulations.

The metal oxide employed in the various embodiments of this invention is selected from the group consisting of Group 4b metal oxides. As used herein, Group 4b is that shown by the Periodic Table of the Elements as presented in the CRC Handbook of Chemistry and Physics, 52nd ed., CRC Press, Cleveland, 1971. Preferably, the metal oxide is selected from the group consisting of titanium dioxide ($TiO_2$) and zirconium dioxide ($ZrO_2$). Good results are expected where the metal oxide is utilized as a powder having a specific gravity of about 3.8 to about 10.0. For reasons of easy availability, low cost and a good balance of coating properties, titanium dioxide is the presently preferred metal oxide for use in this invention.

Coating formulations in the form of a dry powder comprising at least one arylene sulfide polymer as described above and a metal oxide also as described above are readily prepared by simply dry mixing the components in conventional solids blending equipment. Grinding or ball milling the powdered coating formulation can be employed as desired during or after mixing of the formulation components. The powdered coating formulation of this invention will comprise about 55 to about 95 weight percent of a suitable poly(arylene sulfide) or blends thereof as described above and about 5 to about 45 weight percent metal oxide based on the total weight of the powdered formulation. Optionally, the powdered coatings formulation can also contain a small amount of a finely divided silica ($SiO_2$), e.g. fumed silica, in an amount of about 0.1 to about 1.5 weight percent based on the total weight of the formulation. If the powdered coating formulation is to be employed directly in an electrostatic coating method it is preferred that the silica component be present in the formulation since it appears to promote the dispersion of the dry powder in the electrostatic spray.

Liquid slurry coating formulations suitable for spray application according to an embodiment of the invention can be prepared by simply admixing the powdered coating formulation with a suitable liquid carrier. Such a liquid may also be called a vehicle or a liquid dispersing medium. Mixtures of liquids can be employed as desired. For example, a mixture of water with a normally liquid high boiling aliphatic organic compound having 3–12 carbon atoms per molecule and at least one, preferably 2–4 hydroxyl groups per molecule can be employed as a liquid carrier. Preferably, an alkanediol having 3–6 carbon atoms per molecule such as 1,2-propanediol (propylene glycol), can be employed as a liquid carrier component. The viscosity of the slurry often can be easily adjusted by varying the amount of glycol in the mixture with water. However, the liquid organic compounds noted above can be employed in the absence of water with good results. The liquid slurry coating formulations of this invention thus will comprise about 25 to about 40 weight percent of a suitable poly(arylene sulfide) or blends thereof as described above, about 2 to about 20 weight percent metal oxide and about 40 to about 73 weight percent liquid carrier based on the total weight of the liquid slurry formulation. The components of the liquid slurry coating formulations can be mixed in conventional mixing equipment and as noted above the formulation can be subjected to grinding or ball milling during or after mixing of the slurry components.

The substrates to which the coating formulations above can be applied are selected from the group consisting of iron-containing alloys, magnesium-containing alloys, aluminum, glass, and ceramics provided the substrate material can withstand temperatures of about 315° C. up to about 470° C. encountered in curing the arylene sulfide polymer in the coating. It is of course expected that essentially every member of the above group of substrates will be able to withstand a curing temperature within the range cited. It is a noteworthy advantage that special primers are not required when using the above substrates for the arylene sulfide polymer coatings formulated and applied according to this invention. For reasons of availability, cost, and versatility of application the iron-containing alloys are preferred as substrates. Various types of steels such as low-, medium-, and high-carbon steel and stainless steels (martensitic, ferritic, and austenitic types) are examples of such preferred substrates.

A variety of coating methods can be used in applying the coating formulations comprising at least one arylene sulfide polymer and a metal oxide according to this invention. The substrate surface to be coated must first be cleaned such as by grit blasting, chemical etching, solvent washing, vapor degreasing, sonic degreasing and the like including various combinations of such treatments. As used herein, substrate surface cleaning is intended to encompass any ancillary surface roughening that occurs during the cleaning step(s) employed.

It was previously noted above that the powdered coating formulations of this invention can be used directly in known electrostatic coating methods. The electrostatic method can be applied to substrate surfaces which are at ambient temperature (cold) or to substrate surfaces heated to about 370° C. (hot). Subsequent curing of the arylene sulfide polymer, e.g. 0.05–72 hours at 315° C.–470° C., in the coating provides the coated substrate surface. The coating/curing steps can be repeated 1–3 times or as many times as desired to build up the desired thickness of the coating.

The slurry coating method of substrates at ambient temperature can also be used with the liquid slurry coating formulations of this invention which have been previously described herein. Again, the coating/curing sequence can be repeated as desired to build up the desired thickness of the coating.

However, a significant advance in the art shown by this invention is that cured coatings comprising arylene sulfide polymers and a metal oxide which are substantially free of pinhole defects can be obtained in only one or two applications of the coating formulations of this invention.

A preferred method of coating the above suitable substrates with the liquid slurry coating formulations previously described is utilized when the clean substrate surface is heated to an elevated temperature of about 350° to about 470° C. and the liquid slurry coating formulation is sprayed thereon. If the substrate is an iron-containing alloy, a further improvement in coating properties such as adherence is achieved by aging the substrate under conditions of elevated temperature. It is expected that good results can be achieved by conducting the heating step in an atmosphere comprising oxygen, and water vapor e.g. air and maintaining such conditions for a period of at least about 0.5 hour, e.g. about 0.5 to about 2 hours, preferably within the temperature range of about 350° to about 470° C.

Following the spraying of the heated substrate surface with the liquid slurry coating formulation, the coated substrate surface is subjected to further heating from about 350° to about 470° C. for at least about 0.05 hour, e.g. about 0.05 to about 1 hour, to cure the arylene sulfide polymer component of said coating. Thick coatings may require longer heating times. If desired, the process can be repeated by reheating the coated substrate surface as before and spraying another application of the liquid slurry coating formulation thereon followed by the curing step as above. However, in the case of the iron-containing alloy substrate, subsequent applications of the liquid slurry coating formulation to the coated substrate do not need a holding (aging) period at the elevated temperature in the presence of oxygen and water vapor.

Conventionally employed spraying apparatus can be utilized for applying the liquid slurry coating formulations according to the preferred method of this invention. Liquid carrier which becomes vaporized when the slurry spray contacts the heated substrate surface can be conducted away from the coating application zone by a current of inert gas and recovered by condensation in a cooler zone for reuse while the inert gas can be recycled, with cooling if needed, to the coating application zone.

As previously indicated, the arylene sulfide polymer coating formulations and the preferred coating method of this invention are especially useful to coat parts for use in well drilling and fluid production (pumping) from wells where corrosive conditions are encountered. For example, sucker rods (connecting rods) which are widely used in oil producing wells under artificial lift (pumping) conditions are subject to replacement because of corrosion and wear. Such replacement is very costly in terms of materials (new sucker rod), labor, and lost production because of well down time. Wells encountering fluids containing elevated levels of hydrogen sulfide, carbon dioxide, and hot brines are especially vulnerable to rapid corrosion of sucker rods and thus frequent replacement thereof. The increased production costs resulting from such conditions often make such wells unprofitable to keep open.

Sucker rods typically come in lengths of 25 or 30 feet depending on the type of coupling used. Pony rods are short variable length rods used to adjust the total length of the connecting rod string between the subsurface pump and surface lifting device. These pony rods typically are available in lengths of 1½, 2, 3, 4, 6, 8, 10, and 12 feet.

The sucker and pony rods are typically available in diameters of ½, ⅝, ¾, ⅞, 1 and 1⅛ inches. As used hereinafter and in the claims the term sucker rod is intended to encompass both the "standard" length sucker rods as well as the shorter pony rods of variable length.

These rods are made of a various iron-containing alloys, usually in the category of low- and medium-carbon steels also usually containing manganese and in many cases nickel. Couplings for these rods are usually of the pin-and-pin or the box-and-pin type involving threaded connecting surfaces.

According to another embodiment of this invention an article of manufacture is provided which comprises a sucker rod having a continuous cured coating thereon of about 2 to about 10 mils thickness wherein the coating comprises at least one poly(arylene sulfide) and a metal oxide and wherein the coating is essentially free of pinhole defects.

For best results in this embodiment of the invention said at least one poly(arylene sulfide) used in obtaining the coating on the sucker rod should have an extrusion rate of about 80 to about 400 grams/10 min. Likewise for best results in other respects, the coated sucker rod is prepared utilizing the coating formulations of embodiments of this invention previously described above.

Although various known coating methods can be employed to prepare the coated sucker rod of this embodiment of the invention, it is preferred to use the coating method of this invention wherein the clean rod is heated to an elevated temperature and held at this temperature in an atmosphere containing oxygen and water vapor before spraying a liquid slurry coating formulation thereon. For other details of this method reference can be made to the description of the method given in the specification above.

Although improvement in sucker rod lifetime can be expected if only the body of the rod (excluding the coupling means) is provided with the continuous cured coating comprising at least one poly(arylene sulfide) and a metal oxide and wherein the coating is essentially free of pinhole defects, best results are obtained if the entire sucker rod is so coated. In order to provide such a completely coated rod it is preferred to apply a thin coating (about 2 mils) to the threaded coupling portion of the rod so that a tight fit and resulting strong stable connection can be obtained when the rods are linked together. The body of the rod can have a coating of about 2 to about 10 mils thickness, preferably about 3 to about 6 mils, for reasons of economy and ease of preparation.

EXAMPLES

Examples are provided in an effort to assist one skilled in the art to a further understanding of the invention, and yet not be unduly limitative of the reasonable scope of the invention. The particular reactants, conditions, ratios and the like, are all intended to be illustrative of our invention, and not limitative of the reasonable and suitable scope thereof.

EXAMPLE I

Poly(p-phenylene sulfide) (PPS) polymers were obtained which represented a wide range of extrusion rate values for evaluation in coatings applied to steel sucker rods. Some of the polymers were also checked for particle size characterization. Values obtained for extrusion rate and particle size determinations are shown in Table I below.

TABLE I

| Polymer | Extrusion Rate g/10 min. | Particle Size, wt. %[a] | | |
|---|---|---|---|---|
| | | >595μ | <595μ >250 μ | <250μ |
| A | 110 | 6.9 | 20.1 | 73.0 |
| B1 | 229 | 12.2 | 28.9 | 58.9 |
| B2 | 141 | —[b] | — | — |
| B3 | 208 | — | — | — |
| B4 | 129 | 2.4 | 20.4 | 77.2 |
| C1 | 236 | 8.4 | 20.0 | 71.6 |
| C2 | 104 | — | — | — |
| C3 | 187 | — | — | — |
| D | 179 | 11.2 | 26.2 | 62.6 |
| E | 293 | 7.5 | 27.5 | 65.0 |
| F | 59 | 0 | 2.7 | 97.3 |
| G | 3 | 4.7 | 17.8 | 77.5 |

[a]Determined by sieving. The symbol μ stands for microns.
[b]The — indicates not determined.

Polymers A, B1-B4, and E were prepared by use of an added chain terminating agent (three different agents) to the polymerization reaction mixture. Polymers C1-C3 were obtained by adjustment of the polymerization reaction recipe. Polymer D was obtained by using an excess of p-dichlorobenzene reactant in the polymerization reaction mixture. Polymers F and G which serve as comparative PPS polymers are commercially available from Phillips 66 Company as RYTON® PPS grades V-1 and P-6 respectively. These polymers (F and G) have been employed in coatings formulations heretofore.

For preparation of liquid slurry coating formulations used in these tests only the PPS fraction having a particle size of less than 250μ microns was employed for each polymer.

The liquid slurry coating formulations were prepared by mixing each PPS, $TiO_2$, and 1,2-propanediol in a 1 quart Waring Blendor for 15 minutes at ambient temperature. The formulations so prepared contained 30 weight percent PPS, 10 weight percent $TiO_2$ and 60 weight percent 1,2-propanediol based on the total weight of the formulation. The $TiO_2$ used in the formulations had a specific gravity of 4.2.

Sucker rods used in the tests were pony rods 2 feet in length, ⅞ inch diameter and were made of steel which met API specifications for such rods. These rods were obtained from Dover Corp. of Tulsa, Oklahoma. The rods were cleaned with a 50/50 volume percent mixture of xylene/acetone, grit blasted (Model EN-6 Pangborn Corp.) to a white metal finish with #80 $Al_2O_3$ and then heated to 399° C. for two hours.

The liquid slurry coating formulations were sprayed onto the heated rods (302°-399° C.) using a paint spray gun (Model 62 from Binks Mfg. Co.) operated at 25 psi within a spray booth (Model BFA from Binks Mfg. Co.). The rods were held vertically during the spraying procedure. Spraying was stopped when the rod temperature dropped below about 288° C. The coated rods were then heated at 399° C. for 0.5 hour in a PPS curing step. The coating/curing procedure was repeated twice more and the coated rods then annealed for two hours at 232° C.

The coated rods prepared as described above were cut into lengths of about 6 inches for examination by one or more of the following test procedures:

Coating Hardness—ASTM D3363-74— This method defines hardness as the hardest pencil that will not rupture or scratch the film (coating) surface. The pencil hardness designation by letter was converted to a numerical rating according to the following table.

| Pencil Hardness | |
|---|---|
| Letter | Numerical Rating |
| 2B | 1 |
| B | 2 |
| HB | 3 |
| M | 4 |
| F | 5 |
| H | 6 |
| 2H | 7 |
| 3H | 8 |
| 4H | 9 |
| 5H | 10 |

As indicated in the conversion table the numbers 1 to 10 show a range reflecting softest (1) to hardest (10) for the coating being tested.

Coating Thickness—ASTM D1186—This method employed a calibrated thickness gauge (Elcometer, Inc.) which measures changes in magnetic flux as the flux passes through various coating thicknesses. Ten measurements were randomly made along the length and circumference of each rod and the average thickness was then calculated.

Coating Adhesion—An "X" shaped groove was made through the coating with a #22 X-acto knife. The knife blade was inserted into the groove and the coating pried from the surface. Ratings of 1 to 5 were given according to the following criteria with 5 being best. A 5 was given if the coating broke within itself but could not be lifted entirely from the surface. A 4 was given if small areas of metal were visible but over 50% (area) of the coating remained. A 3 was given if small amounts of coating remained but over 50% (area) was removed. A 2 was given if all of the coating was removed. A 1 was given if the coating debonded without the use of a knife.

Pinhole Defects—This method employed an insulation testing instrument (Model 400-2 from Simpson Electric Co. Elgin, Ill.) for resistance measurements. The instrument is basically a high-range ohmmeter (operated in the 2-200 Mohm range) that supplies a high voltage to the part during testing. For these tests a probe was designed which consisted of a synthetic sponge cut to 1 inch thickness when essentially saturated with water. The sponge-probe fit snugly around the rod to make the coating-instrument contact. The rod was marked off into 1 linear inch sections and the probe pushed down the rod while a count was made of the number of times the meter deflected per inch section. The meter deflection indicated current flow and thus a pinhole defect in the coating.

In addition, some of the coated samples were tested after being subjected to a steam autoclave treatment in which the coated samples were placed in a steam autoclave at 25 psi and 130° C. for 100 hours.

Furthermore, some of the coated samples were tested after being subjected to a high pressure autoclave treatment which simulated oil well pumping conditions. These conditions employed a partial pressure of 3,300 psi methane and 800 psi carbon dioxide, 100 mL brine (85.1 g $CaCl_2$ and 39.2 g $MgCl_2$ in 5 gallons distilled water) and 100 mL toluene at a total pressure of 6,000 psi and a temperature of 149° C. for 1 week. At the end of 1 week the autoclave was rapidly vented (in less than one minute) to atmospheric pressure.

Results obtained with PPS coatings on the sucker rods employing each of the PPS resins of Table I are presented in Table II. Some of the polymers were utilized in more than one coating test run.

TABLE II

| | | Sucker Rod Coating | | | |
|---|---|---|---|---|---|
| Run No. | PPS Resin | Thickness mils | Hardness[a] 10 = Best | Adhesion[a] 5 = Best | Pinhole[a] Defects |
| 1 | A | 3.7 | 8,7 | 5,3 | 0 |
| 2 | A | 4.0 | 8,— | 5,— | 0 |
| 3 | B1 | 3.9 | 8,8,(9) | 5,4,(2) | 0 (0) |
| 4 | B1 | 3.6 | 9,— | 4,— | 0 |
| 5 | B2 | 5.1 | 9,— | 5,— | 0 |
| 6 | B3 | 4.0 | 9,— | 5,— | 0 |
| 7 | B4 | 3.2 | 7,8 | 2,3 | 0 |
| 8 | C1 | 4.2 | 8,8 | 4,3 | 0 |
| 9 | C1 | 4.3 | 10,— | 4,— | 0 |
| 10 | C2 | 3.9 | 9,— | 5,— | 0 |
| 11 | C3 | 3.6 | 9,— | 5,— | 0 |
| 12 | D | 4.1 | 8,8 | 4,3 | 2 |
| 13 | D | 4.2 | 9,— | 3,— | 0 |

TABLE II-continued

| | | Sucker Rod Coating | | | |
|---|---|---|---|---|---|
| Run No. | PPS Resin | Thickness mils | Hardness[a] 10 = Best | Adhesion[a] 5 = Best | Pinhole[a] Defects |
| 14 | E | 4.3 | 8,8 | 4,3 | 0 |
| 15 | E | 4.3 | 9,— | 4,— | 0 |
| 16 | F | 4.0 | 8,— | 4,— | 3 |
| 17 | F | 4.0 | 8,— | 4,— | 1 |
| 18 | F | 4.4 | 8,7 | 5,3,(0) | 4 |
| 19 | G | 11.1 | 6,— | 2,— | 9 |
| 20 | G | 8.5 | 6,— | 3,— | 2 |

[a]Second numbers, if shown, indicate that the result was obtained on the sample after the 100 hour steam autoclave treatment. Numbers shown in parentheses indicate that the result was obtained after the high pressure autoclave treatment.

Examination of the results in Table II clearly show that the PPS coatings made with the high extrusion rate PPS resins according to this invention (Runs 1–15) were free of pinhole defects, except for Run 12. However, Run 13 which was essentially a duplicate of Run 12 provided a coating free of pinhole defects. No explanation is known at present for the pinhole defects which were found in Run 12. Comparative Runs 16–20 show that pinhole defects were easily formed in coatings from the prior art PPS resins F and G even at a coating thickness 2–3 times that of the inventive coatings. Compare Runs 19 and 20 with Runs 1 and 2, for example.

Hardness and adhesion ratings for the inventive coatings tended to be as good or better than the comparative coating ratings. After the high pressure autoclave treatment an inventive coating was still intact while the prior art coating had failed (Run 3 vs. Run 18).

EXAMPLE II

Additional coating tests were made in which cold rolled steel panels (5×15×0.3 cm) served as the substrate. These panels had a satin finish and a Rockwell Hardness of 55–65. The test panels were cleaned as in Example I but the coatings were applied at ambient temperature then cured at 399° C. for 0.5 hour. The coating/curing process was repeated two more times and the panels annealed for 2 hours at 232° C.

The pinhole defect test described in Example I was modified for use with the coated steel panels by marking the panel off in 0.25 inch square grid and using a 0.25 square inch sponge on the probe. A count was then made of the number of meter deflections per unit area of the grid.

In this series of tests the arylene sulfide polymer component of the liquid slurry coating formulations was a series of blends of a PPS having an extrusion rate of 129 g/10 minutes with a poly(phenylene sulfide/sulfone) (PPSS) having an inherent viscosity of 0.30 dL/g.

The liquid slurry coating formulations so prepared contained 30 weight percent arylene sulfide polymer, 10 weight percent titanium dioxide and 60 weight percent 1,2-propanediol based on the total weight of the formulation.

Results obtained in this series of tests are presented in Table III below.

TABLE III

| | Polymer | | Panel Coating[a] | | | |
|---|---|---|---|---|---|---|
| Run No. | Blend, wt. % PPS | PPSS | Thickness, mils | Hardness 10 = Best | Adhesion 5 = Best | Pinhole Defects |
| 21 | 100 | 0 | 3.4 | 7,7 | 4,3 | 0 |
| 22 | 100 | 0 | 3.2 | 7,8 | 3,3 | 0 |
| 23 | 92.4 | 7.6 | 3.9 (5.6) | 7,— | 5,5 (0) | 0 (1) |
| 24 | 92.4 | 7.6 | 4.7 | 6,— | 5,— | 0 |
| 25 | 83 | 17 | 3.9 (5.7) | 7,8 (8) | 4,5 (4) | 0 (0) |
| 26 | 83 | 17 | 4.5 | 9,9 | 4,4 | 0 |
| 27 | 83 | 17 | 4.9 | 9,9 | 3,4 | 0 |
| 28 | 67 | 33 | 4.7 (6.5) | 9,10 (9) | 5,5 (3) | 0 (8) |
| 29 | 50 | 50 | 6.6 | 10 | 5,4 | 0 |
| 30 | 0 | 100 | 4.2 | 10 | 4,3 | >40 |

[a]Second number, if shown, indicates that the result was obtained on the sample after the 100 hour steam autoclave treatment. Numbers shown in parentheses indicate that the result was obtained after the sample was subjected to the high pressure autoclave treatment with the sample immersed in the liquid phase of the test medium.

The results in Table III indicate an increase in coating hardness can be obtained by blending increasing amounts of PPSS with a PPS having an extrusion rate of 129 grams/10 minutes. There is also seen a slight but noticeable increase in adhesion rating as PPSS is increased in the blend up to at least about 50 weight percent.

EXAMPLE III

In the manner described in Example II additional steel test panels were coated with liquid slurry coating formulations using blends of a PPS having an extrusion rate of 129 g/10 minutes with a poly(phenylene sulfide-ketone) PPSK having a melt flow rate measured at 371° C. of 418 grams/10 minutes. The results obtained in these tests are presented in Table IV below.

TABLE IV

| | Polymer | | Panel Coating[a] | | | |
|---|---|---|---|---|---|---|
| Run No. | Blend, wt. % PPS | PPSK | Thickness, mils | Hardness 10 = Best | Adhesion 5 = Best | Pinhole Defects |
| 31 | 100 | 0 | 3.4 | 7,7 | 4,3 | 0 |
| 32 | 92 | 8 | 3.3 (3.3) | 7,— | 5,—(0) | 0 |
| 33 | 92 | 8 | 3.6 | 7,7 | 4,5 | 0 |
| 34 | 83 | 17 | 2.4 | 7,8 | 4,3 | 0 |
| 35 | 67 | 33 | 2.2 (4.3) | 9,9 (10) | 4,4 (2) | 8 (2) |
| 36 | 50 | 50 | 2.3 | 10,10 | 5,4 | >40 |
| 37 | 0 | 100 | 2.0 | 10,— | 5,4 | 40 |

[a]Second number, if shown, indicates that the result was obtained on the sample after the 100 hour steam autoclave treatment.
Numbers shown in parentheses indicate that the result was obtained after the sample was subjected to the high pressure autoclave treatment with the sample immersed in the liquid phase of the test medium The results in Table IV again show a trend of increasing coating hardness as increasing amounts of PPSK are blended with PPS having an extrusion rate of 129 grams/10 minutes. Pinhole defects in the coatings appear to increase as the PPSK level reaches 33 weight percent in the blend of polymers.

EXAMPLE IV

In the manner of Example I additional steel pony rods were coated with liquid slurry coating formulations using blends of a PPS with the same PPSK used in the runs of Example III. The results obtained in these tests are presented in Table V below: Table III below.

TABLE V

| | Polymer | | Pony Rod Coating[a] | | | |
|---|---|---|---|---|---|---|
| Run No. | Blend, wt. % PPS | PPSK | Thickness, mils | Hardness 10 = Best | Adhesion 5 = Best | Pinhole Defects |
| 38 | 100 | 0 | 7.6 | — | 5,5 | 0 |
| 39 | 93 | 7 | 6.9 | — | 5 | 0 (9) |
| 40 | 93 | 7 | 7.3 | — | — | 0 |

TABLE V-continued

| Run No. | Polymer Blend, wt. % PPS | PPSK | Thickness, mils | Pony Rod Coating[a] Hardness 10 = Best | Adhesion 5 = Best | Pinhole Defects |
|---|---|---|---|---|---|---|
| 41 | 87 | 13 | 6.0 | —(10) | —(3) | 0 |

[a]A — indicates no test made. A second number, if shown, indicates that the result was obtained on the sample after the 100 hour steam autoclave treatment. Numbers shown in parentheses indicate that the result was obtained after the sample was subjected to the high pressure autoclave treatment with the sample immersed in the liquid phase of the test medium.

The results shown in Table V demostrates that pony rods can be provided with coatings from blends of PPS and PPSK such that the coatings had acceptable hardness and adhesion and were free of pinhole defects.

EXAMPLE V

Additional tests were made with pony rods coated with compositions according to this invention in the manner described in Example I. The coating formulations used in these runs was comprised of 31 weight percent polymer (PPS or blend thereof with a PPSS or PPSK), 10 weight percent titanium dioxide, 0.4 weight percent fumed silica and 58.6 weight percent 1,2-propanediol.

The PPS used in these runs had an extrusion rate of 229 g/10 min. while the PPSK had a melt flow rate of 418 g/10 min. The PPSS had an inherent viscosity of 0.3 dL/g determined as described above.

The results obtained in these runs are shown in Table VI.

TABLE VI

| Run No. | Polymer | Pony Rod Coating[a] Thickness, mils | Hardness 10 = Best | Adhesion 5 = Best | Pinhole Defects |
|---|---|---|---|---|---|
| 42 | PPS | 4.0 | 8 (9) | 5 (4) | 0 (0) |
| 43 | PPS/PPSS (90/10) | 6.0 | 10 (10) | 5 (3) | 0 (0) |
| 44 | PPS/PPSK (87.5/12.5) | 4.7 | 9 (9) | 5 (3) | 0 (0) |

[a]Numbers shown in parentheses indicate that the result was obtained after the sample was subjected to the high pressure autoclave treatment.

In view of the excellent results shown for the runs in Table VI further tests were conducted with pony rods coated as in Runs 42–44 and then employed in a producing oil well which exhibited a corrosive environment. In addition, commercially available epoxy coated pony rods were used for comparative purposes.

The pony rods (96 ft. in total) were divided into 4 groups of about 24 ft. total length and three of the groups were coated with the polymer compositions employed in Runs 42–44 above. The epoxy coated rods were purchased from a coating manufacturer. The coated pony rods were tested as before and then randomly installed in the string of rods used in the producing well and allowed to operate for 5 months. At the end of the 5 month test period the rods were pulled from the well and the coatings tested again for performance evaluation. The results that were obtained are shown in Table VII.

TABLE VII

| Run No. | Polymer | Pony Rod Coating[a] Thickness mils | Hardness 10 = Best | Pinhole Defects[c] |
|---|---|---|---|---|
| 45 | PPS | 6 (6.5) | 8 (10) | 0 (0) |
| 46 | PPS + PPSS (90/10) | 4.6 (5.6) | 10 (10) | 0 (7) |
| 47 | PPS + PPSK (87.5/12.5) | 3.7 (4.1) | 8 (10) | 0 (11) |
| 48 | Epoxy | — (11.7) | —(7) | —(3)[b] |

[a]Numbers shown in parentheses indicate that the result was obtained after the five month test period in the producing well.
[b]There was about 75% area loss of coating on two bottom rods and the remaining coating on these rods had a hardness rating of 6.
[c]Per coated rod (average).

The results shown in Table VII show that the PPS coating (Run 45) performed in an excellent manner in the well test. It is also seen that while pinhole defects did develop in the coatings from the polymer blends (Runs 46 and 47) no instance of catastrophic failure was observed in Runs 45–47 whereas the epoxy coating did show such failure on two of the rods near the bottom of the well. It was concluded that the arylene sulfide polymer coatings were much more resistant to the corrosive conditions encountered in the well than the epoxy resin coating.

EXAMPLE VI

Further tests were conducted in the evaluation of three different PPS resins in coatings of pony rods. These PPS resins differed in extrusion rate as shown in Table VIII below.

Each resin was sieved to pass a 60 mesh screen (particle size <250 microns) and then employed in a liquid slurry coating formulation which was the same as that shown in Example V. Coatings then were applied to the pony rods in the manner of Example I. The coatings then were tested as described in Example I. Results of these tests are presented in Table VIII below. Test results were also determined after the coated rods had been subjected to the high pressure autoclave treatment described in Example I.

TABLE VIII

| Run No. | PPS ER[b]g/ 10 min. | Pony Rod Coating[a] Thickness mils | Hardness 10 = Best | Adhesion 5 = Best | Pinhole Defects per Rod |
|---|---|---|---|---|---|
| 49 | 229 | 4.0 | 8 (9) | 5 (4) | 0 (0) |
| 50 | 59 | 4.0 | 8 (9) | 5 (2) | 3 (>20) |
| 51 | 3 | 10.0 | 6 (7) | 3 (0) | 5 (>>20) |

[a]Numbers shown in parentheses indicate that the result was obtained after the high pressure autoc;ave treatment.
[b]ER = Extrusion Rate The results shown in Table VIII show clearly that the PPS with an extrusion rate of 3 g/10 minutes (Run 51) was much inferior to the other two PPS resins in coating performance even though the thickness of the coating was more than doubled. It is also seen that the PPS with an extrusion rate of 229 g/10 minutes gave much better results than the PPS with an extrusion rate of 59 g/10 minutes (Run 49 vs. Run 50).

Pony rods coated with a formulation employing the PPS of Run 49 were then tested in a relatively shallow producing oil well which exhibited corrosive conditions. This series of tests was conducted for a period of eight months with the coatings being examined before and after the eight month period. Results obtained in this series of tests are shown in Table IX below.

TABLE IX

| Run No. | Rod Depth, ft. | Pony Rod Coating[a] | | |
|---|---|---|---|---|
| | | Thickness mils | Hardness 10 = Best | Pinhole Defects per Rod |
| 52 | 25 | 5.8 (6.4) | —(10) | 0 (3)[b] |
| 53 | 27 | — (5.3) | 8 (9) | 0 (2)[b] |
| 54 | 650 | 5.3 (5.3) | —(10) | 0 (0) |
| 55 | 652 | — (5.4) | 8 (9) | 0 (0) |
| 56 | 1298 | 5.4 (5.5) | —(10) | 0 (0) |
| 57 | 1300 | — (6.2) | 8 (10) | 0 (0) |

[a]Numbers shown in parentheses indicate that the result was obtained after the eight month test period.
[b]Mechanical damage to the coating was observed which presumably occurred during pulling of the rod string from the well.

The results shown in Table IX demonstrate excellent performance of the PPS having an extrusion rate of 229 g/10 minutes in coatings on pony rods used in an oil well having corrosive conditions. Normal lifetime of hardware used in this well had been about three months.

Further tests were conducted by coating pony rods with formulations using the PPS resins of Runs 49 and 50 (Table VIII). These coated pony rods along with pony rods coated with an epoxy resin formulation were tested in a deeper (about 7,800 ft.) producing oil well which exhibited corrosive conditions. This was the same oil well that was employed for the tests of Example V—Table VII. This series of tests was conducted for a period of five months. The coatings were examined before and after the test period. Results obtained in this series of tests are shown in Table X below.

TABLE X

| Run No. | Coating Resin | Rod Depth, ft. | Pony Rod Coating[a] | | |
|---|---|---|---|---|---|
| | | | Thickness mils | Hardness 10 = Best | Pinhole Defects per Rod |
| 58 | Epoxy | 150 | — (11.5) | —(7) | —(3) |
| 59 | PPS-1[b] | 158 | 6.1 (6.7) | 8 (10) | 0 (0) |
| 60 | PPS-2[c] | 160 | 4.4 (5.8) | 8 (8) | 1 (>20) |
| 61 | Epoxy | 2010 | — (12.1) | —(9) | —(5) |
| 62 | PPS-1 | 2002 | 5.9 (6.0) | —(10) | 0 (0) |
| 63 | PPS-2 | 2000 | 4.4 (3.9) | 8 (10) | 0 (>20) |
| 64 | Epoxy | 5500 | — (12.5) | —(7) | —(1) |
| 65 | Epoxy | 5600 | — (11.9) | —(3) | —(15) |
| 66 | PPS-1 | 5510 | 5.0 (7.2) | —(10) | 0 (0) |
| 67 | PPS-2 | 5508 | 3.1 (3.8) | —(10) | 2 (>20) |
| 68 | PPS-2 | 5512 | 3.0 (3.5) | —(10) | 3 (>20) |
| 69 | Epoxy | 7700 | — (12.2) | —(6) | (d) |
| 70 | Epoxy | 7722 | — (10.2) | —(6) | (d) |
| 71 | PPS-1 | 7708 | 6.4 (6.2) | —(10) | 0 (0) |
| 72 | PPS-1 | 7710 | 6.7 (6.5) | —(10) | 0 (0) |
| 73 | PPS-2 | 7712 | 4.4 (4.7) | —(10) | 0 (>20) |
| 74 | PPS-2 | 7714 | 4.1 (4.0) | —(10) | 2 (>20) |

[a]Numbers shown in parentheses indicate that the result was obtained after the five month test period.
[b]PPS-1 is the PPS resin used in Run 49 having an extrusion rate of 229 g/10 minutes.
[c]PPS-2 is the PPS resin used in Run 50 having an extrusion rate of 59 g/10 minutes.
[d]These rods showed loss of about 75% area of coating.

The results shown in Table X demonstrate that excellent results were achieved in the coatings which employed the PPS resin with an extrusion rate of 229 g/10 minutes. It is especially noteworthy that such coatings showed no pinhole defects even after five months service near the well bottom whereas the epoxy coatings had failed and the coatings made using a PPS resin with an extrusion rate of 59 g/10 minutes developed >20 pinhole defects per rod (Runs 71, 72 vs. Runs 69, 70, 73, 74).

EXAMPLE VII

Further tests were conducted to evaluate coatings wherein mixtures of PPS resins having different extrusion rates were employed in the coating formulations. The formulations employed 31% by wt. PPS resin(s), 0.4% by wt. fumed silica, 10.3% by wt. titanium dioxide and 58.3% by wt. 1,2-propanediol. Formulations were mixed in a Waring Blendor (1 quart size) for 15 minutes and applied to cleaned 2"×6" cold rolled steel coupons at ambient conditions with a wire wound rod coating applicator (Leneta Wire-Coter #60 coating rod). Each applied coating was cured at 367° C. for 0.5 hour. An initial set of tests examined the effect of the number of coatings applied on the number of pinhole defects per coupon for coating formulations using a single PPS resin but which differed in extrusion rate (ER) (Table XI). Other tests were conducted with formulations using mixtures of said PPS resins having differing extrusion rates (Table XII) but employing only one coating of the formulation.

TABLE XI

| Run No. | PPS ER, g/10 min. | Coating No. | Thickness mils | Pinhole Defects Per Coupon |
|---|---|---|---|---|
| 75 | 129 | 1 | 1.5 | 12 |
| 76 | 129 | 2 | 2.7 | 0 |
| 77 | 129 | 3 | 3.8 | 0 |
| 78 | 19 | 1 | 1.8 | 61 |
| 79 | 19 | 2 | 2.9 | 4 |
| 80 | 19 | 3 | 4.4 | 0 |

The results in Table XI show that the PPS resin having an extrusion rate of 129 g/10 minutes provided coatings of greatly reduced tendency to show pinhole defects compared to the PPS resin having an extrusion rate of 19 g/10 minutes. Put in other terms, the results in Table XI show that the higher extrusion rate PPS resin gave a pinhole defect-free coating in only two applications while the lower extrusion rate PPS resin required three applications to achieve a pinhole defect-free coating. Furthermore, the thickness of the pinhole defect-free coating was only 2.7 mils for the higher extrusion rate PPS resin but 4.4 mils for the lower extrusion rate PPS resin. This amounts to an increase of 63% in the coating thickness needed to reach the zero pinhole defect condition for the lower extrusion rate PPS resin when compared with the higher extrusion rate PPS resin.

TABLE XII

| Run No. | Wt. Ratio PPS Higher/Lower ER[c] | Thickness mils | Pinhole Defects Per Coupon |
|---|---|---|---|
| 81 | 10/90 | 1.5 (1.5)[a] | 59 (47)[a] |
| 82 | 20/80 | 1.3 (1.5) | 56 (37) |
| 83 | 40/60 | 2.0 (2.3) | 20 (30) |
| 84 | 50/50 | 1.3 (1.2) | 13 (19) |
| 85 | 100/0 | — (—) | 12 (—)[b] |

[a]Numbers shown in parentheses indicate that the result was obtained after the coupon having the cured coating thereon had been annealed at 230° C. for about one hour.
[b]A — indicates that no determination was made.
[c]High ER PPS is PPS having ER of 129 g/10 min. Low ER PPS is PPS having ER of 19 g/10 min.

The results shown in Table XII coupled with the results of Runs 75 and 78 of Table XI show that blending the high extrusion rate PPS resin with the low extrusion rate resin decreases the number of pinhole defects formed in the one application coating. Significantly, at about 50 wt. % of the high extrusion rate PPS in the mixture with the low extrusion rate PPS the pinhole defect count of the blend derived coating becomes essentially the same as that shown for the coating from the high extrusion rate PPS alone (Runs 84 vs. 85).

That which is claimed is:

1. A method of coating at least one surface of a substrate selected from the group consisting of an iron-containing alloy, a magnesium-containing alloy, aluminum, glass and ceramic comprising the steps of:
    (a) providing a clean substrate surface having a temperature of from about 350° C. to about 470° C.,
    (b) spraying said substrate surface with a liquid slurry coating formulation consisting of effective amounts of a metal oxide selected from the group consisting of Group 4b metal oxides, poly(arylene sulfide) and a liquid carrier to provide a coating thereon, wherein said poly(arylene sulfide) has an extrusion rate of about 80 to about 400 grams/10 minutes, and
    (c) further heating said substrate surface having said coating thereon from about 350° C. to about 470° C. for at least about 0.05 hour to provide a cured coating substantially free of pinhole defects.

2. A method according to claim 1 wherein said metal oxide is selected from the group consisting of titanium dioxide and zirconium dioxide.

3. A method according to claim 2 wherein said poly(arylene sulfide) comprises poly(p-phenylene sulfide) and is present in said liquid slurry coating formulation in an amount of about 25 to about 40 weight percent, said metal oxide is present in an amount of about 2 to about 20 weight percent, and said liquid carrier is present in an amount of about 40 to about 73 weight percent based on the total weight of said liquid slurry coating formulation.

4. A method according to claim 3 wherein said poly(p-phenylene sulfide) has an extrusion rate of about 120 to about 300 grams/10 minutes and a particle size principally in the range of about 10 to about 250 microns.

5. A method of coating at least one surface of a substrate selected from the group consisting of an iron-containing alloy, a magnesium-containing alloy, aluminum, glass and ceramic comprising the steps of:
    (a) providing a clean substrate surface having a temperature of from about 350° C. to about 470° C.,
    (b) spraying said heated substrate surface with a liquid slurry coating formulation consisting of effective amounts of a metal oxide selected from the group consisting of Group 4b metal oxides, a mixture of a first poly(arylene sulfide) with a second poly(arylene sulfide) selected from the group consisting of poly(p-phenylene sulfide) having an extrusion rate of about 5 to about 75 grams/10 minutes, poly(phenylene sulfide/sulfone) and poly(phenylene sulfide/ketone) and a liquid carrier to provide a coating thereon and wherein said first poly(arylene sulfide) has an extrusion rate of about 80 to about 400 grams/10 minutes, and
    (c) further heating said substrate surface having said coating thereon from about 350° C. to about 470° C. for at least about 0.05 hour to provide a cured coating substantially free of pinhole defects.

6. A method according to claim 5 wherein said metal oxide is selected from the group consisting of titanium dioxide and zirconium dioxide.

7. A method according to claim 6 wherein said first poly(arylene sulfide) comprises poly(p-phenylene sulfide) and wherein said mixture is present in said liquid slurry coating formulation in an amount of about 25 to about 40 weight percent, said metal oxide is present in an amount of about 2 to about 20 weight percent, and said liquid carrier is present in an amount of about 40 to about 73 weight percent based on the total weight of said coating formulation.

8. A method according to claim 7 wherein the weight ratio of said first poly(p-phenylene sulfide) to said second poly(arylene sulfide) in said mixture is about 0.1:1 to about 10:1 and wherein said second poly(arylene sulfide) is one of poly(phenylene sulfide/sulfone) and poly(phenylene sulfide/ketone).

9. A method according to claim 8 wherein said second poly(arylene sulfide) comprises poly(phenylene sulfide/sulfone) having an inherent viscosity of about 0.05 to about 0.7 dL/g and wherein said weight ratio of said poly(p-phenylene sulfide) to said poly(phenylene sulfide/sulfone) is about 3:1 to about 7:1.

10. A method according to claim 8 wherein said second poly(arylene sulfide) comprises poly(phenylene sulfide/ketone) having a melt flow rate measured at 371° C. of about 1 to about 1000 grams/10 minutes and wherein said weight ratio of said poly(p-phenylene sulfide) to said poly(phenylene sulfide/ketone) is about 3:1 to about 9:1.

11. A method according to claim 7 wherein said second poly(arylene sulfide) comprises poly(p-phenylene sulfide) having an extrusion rate of about 5 to about 75 grams/10 minutes and wherein said weight ratio of said first poly(p-phenylene sulfide) to said second poly(p-phenylene sulfide) is greater than about 0.2:1.

12. A method according to claim 9 wherein said poly(p-phenylene sulfide) has an extrusion rate of about 120 to about 300 grams/10 minutes and a particle size principally in the range of about 10 to about 250 microns.

13. A method according to claim 10 wherein said poly(p-phenylene sulfide) has an extrusion rate of about 120 to about 300 grams/10 minutes and a particle size principally in the range of about 10 to about 250 microns.

14. A method according to claim 11 wherein said first poly(p-phenylene sulfide) has an extrusion rate of about 120 to about 300 grams/10 minutes and a particle size principally in the range of about 10 to about 250 microns.

15. A method of coating at least one surface of an iron-containing alloy comprising the steps of:
    (a) providing a clean iron-containing alloy surface,
    (b) heating said surface from about 350° C. to about 470° C. in an atmosphere comprising oxygen and water vapor for a period of at least about 0.5 hour,
    (c) spraying said heated surface with a liquid slurry coating formulation consisting of effective amounts of a metal oxide selected from the group consisting of Group 4b metal oxides, at least one poly(arylene sulfide) and a liquid carrier to provide a coating thereon wherein said at least one poly(arylene sulfide) has an extrusion rate of about 80 to about 400 grams/10 minutes, and
    (d) further heating said surface having said coating thereon from about 350° C. to about 470° C. for at least about 0.05 hour to provide a cured coating substantially free of pinhole defects.

16. A method according to claim 15 wherein said liquid carrier is selected from the group consisting of water, aliphatic organic compounds having 3–12 carbon atoms per molecule and at least one hydroxyl group per molecule and mixtures of water with said aliphatic organic compounds and wherein said metal oxide is selected from the group consisting of titanium dioxide and zirconium dioxide.

17. A method according to claim 16 wherein said poly(arylene sulfide) comprises poly(phenylene sulfide) having an extrusion rate of about 120 to about 300 grams/10 minutes and a particle size principally in the range of about 10 to about 250 microns and is present in an amount of about 25 to about 40 weight percent, wherein said liquid carrier comprises an alkane diol having 3–6 carbon atoms per molecule and is present in an amount of about 40 to about 73 weight percent and wherein said metal oxide comprises titanium dioxide present in an amount of about 2 to about 20 weight percent based on the total weight of said coating formulation.

18. A method of coating at least one surface of an iron-containing alloy comprising the steps of:
    (a) providing a clean iron-containing alloy surface,
    (b) heating said surface from about 350° C. to about 470° C. in an atmosphere comprising oxygen and water vapor for a period of at least about 0.5 hour,
    (c) spraying said heated surface with a liquid slurry coating formulation consisting of effective amounts of a liquid carrier, a metal oxide selected from the group consisting of Group 4b metal oxides, and a mixture of a first poly(arylene sulfide) and a second poly(arylene sulfide) wherein said second poly(arylene sulfide) is selected from the group consisting of poly(p-phenylene sulfide) having an extrusion rate of about 5 to about 75 grams/10 minutes, poly(phenylene sulfide/sulfone) and poly(phenylene sulfide/ketone) and wherein said first poly(arylene sulfide) has an extrusion rate of about 80 to about 400 grams/10 minutes, and
    (d) further heating said surface having said coating thereon from about 350° C. to about 470° C. for at least about 0.05 hour to provide a cured coating substantially free of pinhole defects.

19. A method according to claim 21 wherein said liquid carrier is selected from the group consisting of water, aliphatic organic compounds having 3–12 carbon atoms per molecule and at least one hydroxyl group per molecule and mixtures of water with said aliphatic organic compounds and wherein said metal oxide is selected from the group consisting of titanium dioxide and zirconium dioxide and wherein said first poly(arylene sulfide) comprises poly(p-phenylene sulfide) having an extrusion rate of about 120 to about 300 grams/10 minutes and a particle size principally in the range of about 10 to about 250 microns.

20. A method according to claim 19 wherein said liquid carrier comprises an alkane diol having 3–6 carbon atoms per molecule and is present in an amount of about 40 to about 73 weight percent and wherein the weight ratio of said first poly(p-phenylene sulfide) to said second poly(arylene sulfide) in said mixture is about 0.1:1 to about 10:1 and wherein said second poly(arylene sulfide) is one of poly(phenylene sulfide/sulfone) and poly(phenylene sulfide/ketone) and wherein said mixture is present in an amount of about 25 to about 40 weight percent and wherein said metal oxide is present in an amount of about 2 to about 20 weight percent based on the total weight of said liquid slurry coating formulation.

21. A method according to claim 20 wherein said second poly(arylene sulfide) comprises poly(phenylene sulfide/sulfone) having an inherent viscosity of about 0.05 to about 0.7 dL/g and wherein said weight ratio of poly(p-phenylene sulfide) to said poly(phenylene sulfide/sulfone) is about 3:1 to about 7:1.

22. A method according to claim 20 wherein said second poly(arylene sulfide) comprises poly(phenylene sulfide/ketone) having a melt flow rate measured at 371° C. of about 1 to about 1000 grams/10 minutes and wherein said weight ratio of said first poly(p-phenylene sulfide) to poly(phenylene sulfide/ketone) is about 2:1 to about 9:1.

23. A method according to claim 19 wherein said second poly(arylene sulfide) comprises poly(p-phenylene sulfide) having an extrusion rate of about 5 to about 75 grams/10 minutes and wherein said weight ratio of said first poly(p-phenylene sulfide) to said second poly(p-phenylene sulfide is greater than about 0.2:1.

* * * * *

UNITED STATES PATENT AND TRADEMARK OFFICE
CERTIFICATE OF CORRECTION

PATENT NO. : 4,904,502

DATED : February 27, 1990

INVENTOR(S) : Lyle R. Kallenbach and Michael C. Yu

It is certified that error appears in the above-identified patent and that said Letters Patent is hereby corrected as shown below:

Column 19, line 39, "claim 21" should be ---claim 18---.

Signed and Sealed this

First Day of June, 1993

Attest:

MICHAEL K. KIRK

Attesting Officer

Acting Commissioner of Patents and Trademarks